(12) United States Patent
Brun et al.

(10) Patent No.: US 7,940,477 B2
(45) Date of Patent: May 10, 2011

(54) SOLID IMMERSION LENS AND RELATED METHOD FOR MAKING SAME

(75) Inventors: Mickaël Brun, Eybens (FR); Salim Mimouni, Grenoble (FR); Sergio Nicoletti, Saint Martin d'Heres (FR); Ludovic Poupinet, Sassenage (FR); Hubert Moriceau, Saint Egreve (FR)

(73) Assignee: Commissariat A l'Energie Atomique Et Aux Energies Alternatives, Paris (FR)

( * ) Notice: Subject to any disclaimer, the term of this patent is extended or adjusted under 35 U.S.C. 154(b) by 0 days.

(21) Appl. No.: 12/678,730

(22) PCT Filed: Sep. 16, 2008

(86) PCT No.: PCT/EP2008/062296
§ 371 (c)(1),
(2), (4) Date: Mar. 17, 2010

(87) PCT Pub. No.: WO2009/037249
PCT Pub. Date: Mar. 26, 2009

(65) Prior Publication Data
US 2010/0200770 A1    Aug. 12, 2010

(30) Foreign Application Priority Data

Sep. 17, 2007    (FR) ...................................... 07 57641

(51) Int. Cl.
*G02B 3/08* (2006.01)
*G02B 7/02* (2006.01)
(52) U.S. Cl. ........................................ 359/741; 359/811
(58) Field of Classification Search .................. 359/741, 359/811, 642
See application file for complete search history.

(56) References Cited

U.S. PATENT DOCUMENTS

| 2001/0004348 A1 | 6/2001 | Ueyanagi |
| 2007/0186627 A1 | 8/2007 | Yi et al. |
| 2010/0116976 A1* | 5/2010 | Wober ................. 250/227.23 |

FOREIGN PATENT DOCUMENTS

| EP | 1 482 297 A | 12/2004 |
| WO | WO 00/23840 A | 4/2000 |
| WO | WO 02/063613 A | 8/2002 |
| WO | WO 2005/045815 A | 5/2005 |

OTHER PUBLICATIONS

Erik P.A.M. Bakkers, et al., "Epitaxial Growth of III-V Nanowires on Group IV Substrates", MRS Bulletin, Feb. 2007, pp. 117-122, vol. 32.
Brendan M. Kayes, et al., "Growth of Vertically Aligned Si Wire Arrays Over Large Areas with Au and Cu Catalysts", Applied Physics Letters, Sep. 5, 2007.

(Continued)

*Primary Examiner* — William C Choi
(74) *Attorney, Agent, or Firm* — LaRiviere, Grubman & Payne, LLP

(57) ABSTRACT

The invention generally pertains to the field of solid immersion lenses for optical applications in high resolution microscopy. The lens of the invention includes a spherical sector limited by a planar surface and an object having nanometric dimensions arranged on the planar surface at the focus of said solid immersion lens. A light-opaque layer having a central opening with nanometric dimensions can be provided on the planar surface, said opening being centred on the focus of the solid immersion lens. The nano-object can be a tube or a thread having a cylindrical shape. The lens of the invention can be made using lithography techniques.

24 Claims, 6 Drawing Sheets

OTHER PUBLICATIONS

Kazuhiro Yanagi, et al., "Light-Harvesting Function of B-Carotene Inside Carbon Nanotubes", Physical Review B, Oct. 18, 2006.

AV Melechko, et al., "Vertically Aligned Carbon Nanofibers and Related Structures: Controlled Synthesis and Directed Assembly", Applied Physics Reviews, Feb. 3, 2005.

Hongjie Dai, "Carbon Nanotubes: Opportunities and Challenges", Surface Science, Jul. 11, 2001, pp. 218-241.

Justin C. Johnson, et al., "Single Gallium Nitride Nanowire Lasers", Nature Materials, Oct. 2002, pp. 106-110.

* cited by examiner

SOLID IMMERSION LENS AND RELATED METHOD FOR MAKING SAME

PRIORITY CLAIM

This application claims priority to PCT Patent Application Number PCT/EP2008/062296, entitled Solid Immersion Lens and Related Method for Making Same, filed on Sep. 16, 2008.

FIELD OF THE INVENTION

The field of the invention is that of immersion lenses for writing or reading optical information of submicron size.

BACKGROUND OF THE INVENTION

The possibility of focusing an electromagnetic wave on zones of very small area has been used, for a long time, for applications in a very wide variety of fields. The following may be mentioned: microscopy; production of optical detectors or sensors; production of optical systems for writing and/or reading data on a recording medium; and, more generally, all applications in which light is used for locally modifying or probing a focusing zone or the material that is located thereat. In addition, the course in miniaturizing devices and systems, together with the advent of nanosciences and nanotechnologies, requires an increase in the ability of optical probes being focused onto ever smaller areas.

However, focusing an electromagnetic wave by a conventional far-field optical system is normally limited by the Rayleigh criterion to a radius r equal to $\lambda/2n \sin \theta$, in which r is the size of the focal point, $\lambda$ is the wavelength of the electromagnetic wave, n is the optical index of the material in which said wave propagates, and $\theta$ is the maximum opening angle of the focusing lens system. To focus a wave onto areas of small as possible radius, several approaches are generally followed.

The first consists in increasing the maximum numerical aperture NA, equal to $n \sin \theta$. This is accomplished either by immersion in a liquid of high optical index or by immersion in a solid material, again of high optical index, having a hemispherical or superhemispherical lens. Such a lens is referred to as an SIL (solid immersion lens), the focal point thereof lying in the plane of the hemisphere or the superhemisphere. In practice, these techniques enable the light to be focused on a focal spot smaller by a factor n or $n^2$ than a conventional system while maintaining a transmission close to 100%, the factor depending on the shape of the lens. The limitation of this technique is tied to the optical index of the material, which does not exceed a few units.

The second possible approach consists in concentrating this field by what are called near-field optical methods. These methods exploit the natural localization of the electromagnetic field in the immediate vicinity of a nano-object, in the form of a nonpropagating field due to diffraction. The term "nano-object" is understood to mean an object having at least one of its dimensions smaller than a few tens of nanometers. The geometry, the spatial distribution and the amplitude of this field are determined, on the one hand, by the nature, the geometry and the size of the nano-object and, on the other hand, by the polarization and wavelength characteristics of the diffracted light. The operation is as follows: an incident wave is sent onto a nano-object that diffracts this wave, its size being small compared with the wavelength. The resultant field has a conventional propagating component and a nonpropagating component that remains localized close to the nano-object and called the near field. This near field can then be modified by a second object, again of small size compared with the wavelength. The modification is either a diffraction, a scattering or a modulation of the field. Many applications use the generation and detection of this localized field for writing memory cells, for characterizing, exciting and detecting objects, generally of nanoscale dimensions spatially localized in this near field created by the first nano-object, near-field microscopy, etc. In practice, two types of nano-object are used to generate the localized field.

The first type of nano-object is a nanoscale hole in an opaque screen, generally a metal screen. It can be produced in planar geometry or in a metal coating on a dielectric support, such as an optical fiber or a waveguide. In this geometry, the size of the focal spot depends only on the size of the hole. The near field generated in transmission is used by these holes so as to optimally circumvent the incident wave, offering a good signal-to-noise ratio. In the case of metal screens, the enhancement effect, by plasmon mode coupling, may also be advantageously used to further increase the signal-to-noise ratio between the local field and the propagating field. The main limitations of this approach stem, on the one hand, from the low transmission obtained, which is proportional to the factor $(a/\lambda)^4$ where a is the diameter of the hole, and, on the other hand, from the penetration depth of the light wave into the opaque material constituting the screen, said depth being tied to the skin depth in metals. Theoretically, the resolution is limited to about 15 to 20 nm. This type of structure has been very widely used, for example for applications of the near-field optical microscopy type with an aperture. The techniques used to produce these fiber-optic-based tips are generally not compatible with standard microelectronic processes and these tips are therefore not very reproducible. To remedy this situation, certain standard processes have been proposed. The reader may refer in particular to the article by P. N. Minh et al. published in Review of Scientific Instruments—Vol. 71, 3111 (2000). However, the size of the nanoscale aperture in the screen cannot be controlled to better than 50 nm.

The second approach consists in using a single nano-object of defined geometry, such as a nanosphere, a nanodisk or a paraboloid having at least one confined dimension so as to concentrate the near field thereof. In this approach, the skin effect is not a limitation and the field may be potentially confined over very small dimensions. Likewise, the transmission is generally no longer a problem when this approach is considered. However, it is necessary to extract the confined-field signal from the incident signal. This is accomplished by modulation techniques, which involve either the physical manipulation of these nano-objects, something which is often difficult, or the use of the enhancement effect via surface plasmon modes in the case of metal structures. This geometry is very widely used to produce sensors and detectors and for near-field optical microscopy without an aperture. However, the manipulation of single zero-dimensional nano-objects remains difficult and in practice nanoscale objects having at least one macroscopic dimension are more often used.

To combine the advantages of the two approaches, that with an aperture and that without an aperture, so as to maintain the ultimate resolution with a favorable signal-to-noise ratio, it is known to add a nano-object to a nano-aperture. In this regard, the article by T. H. Taminiau et al., published in Nano Letters Vol. 7, 28 (2007) entitled "$\lambda/4$ *resonance of an optical monopole antenna probed by single molecule fluorescence*" may be mentioned. In this case, a metal antenna is attached to an SNOM (scanning near-field optical microscope) tip or NSOM (near-field scanning optical microscope) tip having a conventional aperture using focused ion beam techniques. The limitations of this structure are numerous. Firstly, the transmission from the conventional SNOM optical tip remains low, as in the case of the abovementioned tips with an aperture. Secondly, the nano-object serving as antenna is produced by etching the metal mask with a focused ion beam. These production techniques cannot be easily exploited for production in parallel of these focusing heads using mass fabrication techniques.

It is also known to use SIL lenses for near-field excitation or collection of the aperture type, while still maintaining a transmission close to 100%. The generation of evanescent waves at the focal point of the SIL lens it is then tied to the total internal reflection at the plane interface of the lens due to its geometry. This has been advantageously employed in many applications:

- of the microscopy type: the reader may refer to the publication by S. M. Mansfield et al., published in Applied Physics Letters Vol. 57, 2615 (1990);
- of the optical recording type: see the same authors, Optics Letters 18, 305 (1993);
- or else photolithography, see article by L. P. Ghislain et al., Applied Physics Letters 74, 501 (1999).

Such SIL lenses have also been combined with a pyramidal or conical tip. These solutions have been described in U.S. Pat. No. 6,441,359. This tip is produced on the focal point side of the lens, enabling this lens to be scanned, close to the measured specimen, over a distance close to the wavelength. Such tips have a typical radius of curvature of 500 nm and are produced in the same material as that constituting the SIL. It is also known to add a metal coating to this tip, said coating being pierced by a nanoscale hole serving to limit the size of the focal point. The main drawback of these tips is their low aspect ratio—the apex cone angle is typically 65° so as to maintain the focusing effect. This angle is very unfavorable for obtaining a high topographical resolution in applications of the near-field microscopy type. These tips may have a metal coating but they then suffer from the same limitations as SNOM tips with conventional apertures as described above.

SUMMARY OF THE INVENTION

The idea of the present invention is to use what is called a 1D nano-object made of a semiconductor material, such as a nanowire, a carbon nanotube or a single nanopillar at the focal point of an SIL as tip having a high aspect ratio on the one hand, and as an antenna for increasing the optical resolution on the other. The nano-object is coupled to the macroscopic world via the solid immersion lens at the focal point of which this 1D nano-object is positioned. It is particularly advantageous to produce the nano-object from a semiconductor material. Specifically, a nano-object is characterized inter alia by its aspect ratio. This corresponds to the ratio of the height of the nano-object above its support divided by its diameter in the plane of the support. A high ratio allows easier control of the device relative to the surface along which the device moves and/or makes it possible to relax the flatness constraints on this surface. Now, metal nano-objects have quite low aspect ratios, limited to 2 or 3, whereas nano-objects made of a semiconductor material may have much higher aspect ratios, of the order of 10.

More precisely, one subject of the invention is a solid immersion lens for optical applications, which comprises a spherical sector bounded by a plane surface, characterized in that a wire or tube of cylindrical shape made of a semiconductor material, the generatrices of which are perpendicular to the plane surface and at least one dimension of which is of nanoscale, is placed on the plane surface at the focal point of said solid immersion lens.

Advantageously, a layer opaque to light having a central aperture of nanoscale dimensions is placed on the plane surface, said aperture being centered on the focal point of the solid immersion lens. The wire may be made of silicon and may have, at its free end, a gold nanoparticle. It may also be made of zinc oxide or gallium nitride or may be a tubular fullerene.

Advantageously, the spherical sector is made of a material having a high refractive index.

The invention also relates to an optical device comprising an optical lens according to the above provisions, the device then including either means for generating an electromagnetic wave that are designed so as to excite the object of nanoscale dimensions, or means for detecting a localized electromagnetic wave at the object of nanoscale dimensions.

Advantageously, the lenses are organized in a matrix comprising several rows of columns, each column comprising several lenses.

Advantageously, the lens is produced by lithography techniques and the process includes at least a first production step that may be carried out in two different ways. In a first method of implementation, the following are deposited:

- on a substrate of a first material, a first layer of a second material different from the first material capable of being isotropically etched; and
- a second layer of a third material having an aperture of nanoscale dimensions.

In a second method of implementation, deposited on a substrate of a first material capable of being isotropically etched is a second layer of a third material having an aperture of nanoscale dimensions.

Advantageously, the process comprises at least the following steps:

- step 2: production, in the substrate or the first layer, through the aperture in the second layer, of a cavity of substantially hemispherical shape by isotropic etching or oxidation;
- step 3: deposition of a fourth material in the hemispherical cavity so as to form a spherical sector;
- step 4: removal, from the second face of the substrate, of that part of the substrate covering the spherical sector so as to expose the latter; and
- step 5: production of an object of nanoscale dimensions in or on the first layer, at the center of the aperture in the second layer.

Advantageously, the first step is followed by step 1a of producing a nanopillar centered on the aperture in the second layer and step 5 consists in producing the object of nanoscale dimensions from this nanopillar.

Advantageously, step 5 is followed by a step 5a of growing a layer of a fifth material on the object of nanoscale dimensions.

Advantageously, step 5 is followed by a step 6 of producing a layer opaque to light, sparing the object of nanoscale dimensions.

Advantageously, the third material is a material opaque to light.

Advantageously, the first material is silicon, the second material is silicon or silicon oxide, the third material is silicon oxide or silicon nitride, and the fourth material is a material having a high refractive index, such as silicon oxide or hafnium oxide.

BRIEF DESCRIPTION OF THE DRAWINGS

The invention will be better understood and other advantages will become apparent on reading the following description given by way of nonlimitation, together with the appended figures in which.

MORE DETAILED DESCRIPTION

Figure 1:
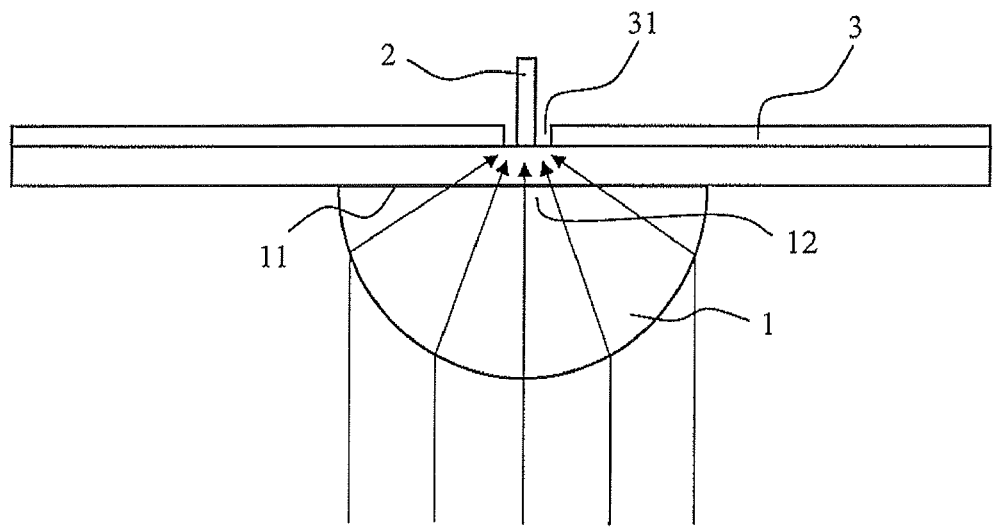
FIG. 1 shows a view of a lens according to the invention.

FIG. 1 shows a cross-sectional view of a solid immersion lens according to the invention. It essentially comprises:

a spherical sector 1 bounded by a plane surface 11. This sector constitutes a focusing structure of the solid immersion lens type capable of focusing an incident light beam onto an area of the structure, called the focal area or focal point 12. This lens may be made of silica. This lens may be produced in planar geometry by lithography techniques, allowing parallel integration thereof; and an object 2 of nanoscale dimensions, called a nano-object, which is placed on the plane surface 11 at the focal point of said solid immersion lens.

This nano-object may serve as a tip of high aspect ratio for applications in which the assembly comprising the solid immersion lens and the nano-object is scanned in the near field of a specimen so as to carry out the analysis thereof or to modify the nature thereof These 1D nano-objects of high aspect ratio, such as nanowires and nanotubes, are used as high-resolution AFM (atomic force microscopy) tips. Consequently, the lens according to the invention may be used as a multifunction tip in either AFM or SNOM applications and possibly STM (scanning tunneling microscopy) applications. In SNOM applications, the nano-object 2 may:

be excited by the light beam emanating from the SIL in the focal area, capable of transmitting this signal to its opposite end and/or of inducing field enhancement and spatial localization effects capable of locally modifying or probing its environment. It can then be used, for example, for media writing functions or for molecular excitation functions, etc.; or be used for detecting a localized electromagnetic field and for transmitting this signal through its structure into the macroscopic world.

The nano-object 2 is chosen from one or more molecules, or one or more aggregates, or one or more nanowires, or one or more nanotubes or fullerenes, whether these be organic or inorganic, or semiconducting or insulating, and may or may not be "functionalized", may or may not be doped and may or may not be coated with an additional coating. This coating may be a metal coating. The term "functionalization" is understood as the capability of the nano-object of being modified so as to give it a particular function. In the case of fullerenes, this functionalization may be carried out on the inside or the outside of the carbon cage. In the case of nanowires, the metal catalyst nanoparticle at the end of the nanowire, necessary for the growth phase, may serve as the nano-object shifted to and positioned in the focal point of the lens in a controlled manner during the growth step. Thus, the nature of the nano-object makes it possible for the nature of the exploitable signal to be modified according to the desired application. As nonlimiting examples:

if the nano-object is a silicon nanowire, the presence of a gold catalyst nanoparticle in or at the end of the wire is used to generate a plasmon that concentrates the field only a few nanometers from the nanoparticle. In this case, by controlling the growth of the wire it is possible for the plasmon resonator to be easily positioned and manipulated;

if the nano-object is a ZnO or GaN nanowire, the guided luminescence in the nanowire may be used;

if the nano-object is a carbon nanotube or fullerene, the possibility of functionalizing the inside of the tube with a single molecule may be exploited.

In the case of photoluminescent nanowires, the luminescence of the individual nanowire may be exploited. The SIL system associated with the nanowire positioned at its focal point enables the light to be effectively coupled into the nanowire so as, on the one hand, to excite the photoluminescence of this individual nanowire and, on the other hand, to collect the re-admitted luminescence in the lens.

Various applications may exploit this coupling into an individual wire. For example, it has been shown that an individual nanowire behaves as a laser nanocavity and may give rise to stimulated emission: in this regard, see the article "Un effet laser" [A laser effect] by Johnson et al. in Nature Materials 1, 106 (2002). This therefore provides an integrated nanoscale laser that can be used to illuminate and/or modify a surface, or to carry out photolithography by a matrix of nanolasers, or used as a structure for injection into the wire, which behaves as a waveguide for long-distance optical communications.

The luminescence of an individual nanowire is also greatly modified by its immediate environment. For example, the presence of a metal surface a few tens of nanometers away may "extinguish" the luminescence of the nanowire. By probing the luminescence of the nanowire recoupled into the lens, it is therefore possible to map the metal surface by scanning the surface with the nanowire used as optical probe in near field. In the same way, the SIL structure associated with the nanowire enables both ends of the nanowire to be used. The end coupled to the SIL serves as light entry/exit point and the free end is capable of probing the near-field environment of the wire. If a surface having variable refractive indices is scanned, the proportion of light emitted by the nanowire onto the surface is higher the higher the index of the material. For constant excitation power, the part re-emitted back to the SIL therefore decreases correspondingly. The probe makes it possible in this example to map the optical index variation of a surface with a resolution of the nanoscale size of the probe corresponding to the diameter of the nanowire.

When the nano-object is a carbon nanotube or fullerene, it may be used as a cage in which nanoscale objects having useful optical properties may be inserted. For example, it has been shown that it is possible to introduce organic molecules such as β-carotene into a carbon nanotube by chemical treatment and by cleaning of the excess molecules. The article by K. Yanagi et al., in Phys. Rev. B 74, 155420 (2006) may be referred to on this point. This opens the way to producing a nanotube probe having, on its end, a single organic molecule, typically a chromophore, coupled to a lens so as to access its electronic properties and having a free end which can be coupled to its immediate environment in order to probe the latter. It is possible, for example, to excite and detect the luminescence of this molecule via the SIL and to record the modifications thereof so as to obtain the optical properties of the surface under investigation, as in the previous example. The phenomenon of Förster energy transfer, also called FRET (fluorescence resonance energy transfer), may also be used to advantage for imaging molecular objects deposited on a surface. If the molecule in the nanotube is brought to within a few nanometers of another molecule, it may be de-excited no longer radiatively, but by giving up its energy to the second molecule nonradiatively by dipole coupling. The luminescence of the probe molecule is then extinguished, thereby making it possible to distinguish the presence of the second molecule and therefore to image the latter, or at least map an optical property thereof. Here too, the "molecular" size of the probe makes it possible to envision mapping with a resolution typically of the size of the probe molecule.

In the case shown in FIG. 1, a layer 3 opaque to the light beam is placed against that face of the structure having the focal area. This face is provided with a nanoscale hole 31 having a size smaller than that of the focal area 12 of the lens so as to reduce the focal area of the lens. Advantageously, the aperture in the opaque layer is self-aligned with the focal area. Moreover, this layer is a monolayer or a multilayer, depending on the intended applications. The SIL serves in this case to increase the transmission through the hole. The apertured metal mask also serves to align the electric field with the axis of the nanowire. The nano-object is located in the aperture in the opaque layer and over the focal area of the focusing structure.

The solid immersion lens according to the invention is connected to means for exciting the nano-object and for using the response thereof. These means are not shown in FIG. 1. Its use means may be:

processing means for using the response of the nano-object to characterize it, or to characterize the coupling of this response with another nearby object in a sensor-type function;

writing means for using the response of the nano-object to locally modify a layer, notably a recording or lithographic layer;

reading means for using the response of the nano-object to locally probe the state of a recording layer or to map a local response on a specimen of interest or an irradiated lithography layer.

It may be advantageous to use devices according to the invention in a matrix manner, in particular to write onto a recording or lithographic medium, or to use several sensors simultaneously.

The production of the SIL addressing structure with its apertured metal screen and its nano-object can be carried out in parallel with standard microelectronic techniques. These techniques are very reproducibile and enable multiple read/write heads to be mass produced. This type of head combines the advantages of apertured probes with those of aperture-free probes in terms of signal-to-noise ratio and resolution, while still ensuring substantial transmission thanks to the lens. These heads provide a diversity of functions through the various nano-objects positioned at the focal point of the SIL.

Figure 2:
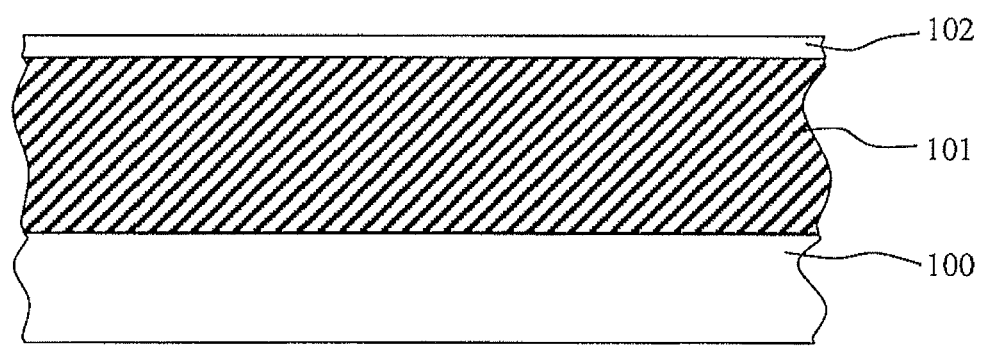
FIGS. 2 to 7 show the various steps of a first process for producing a lens according to the invention.
Figure 3:
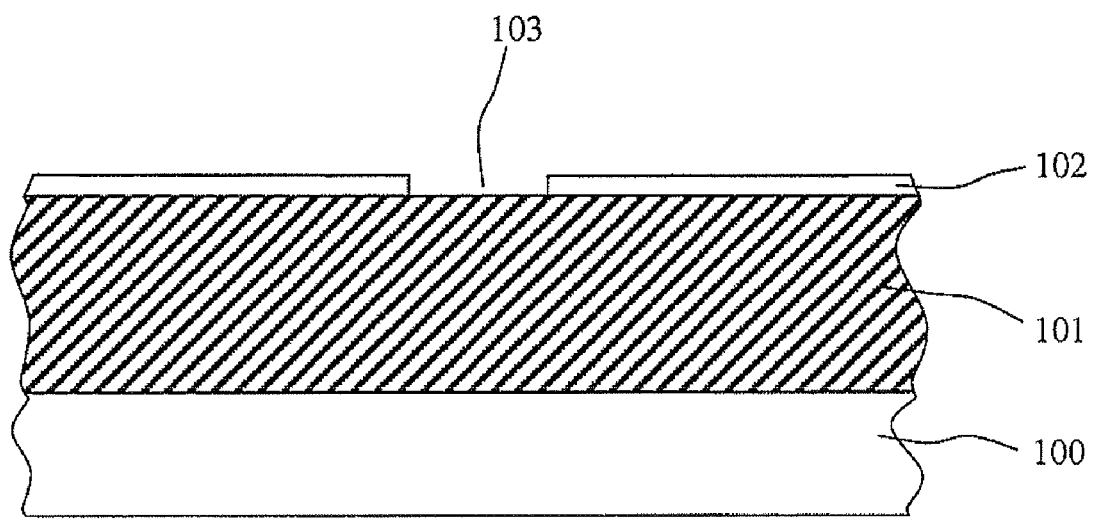

By way of a first example, the steps of a process for producing a lens according to the invention, which are typical of the microelectronic industry, are detailed in FIGS. 2 to 7. These figures show cross-sectional views of the lens during the various steps in the production thereof:

in a first step illustrated in FIGS. 2 and 3, a first material of a stack is produced on a first face of a substrate 100, said stack comprising:
a first layer (101) of a second material capable of being isotropically etched. It should be noted that this layer could be the substrate 100 itself;
a second layer 102 formed by at least a third material. This second layer may be both opaque to the light and resistant to the isotropic etching of the lower layer. Of course, this single layer may be replaced by a multilayer stack in order to obtain the desired effects; and next, an aperture 103 of nanoscale dimensions is produced in this second layer. The aperture has a diameter smaller in size than that of the focusing structure to be produced.

Figure 4:
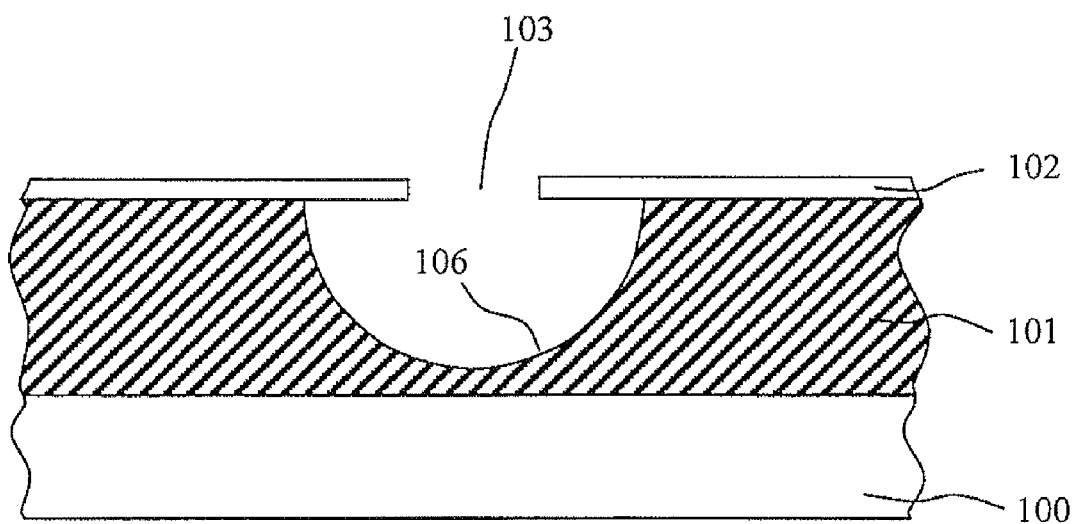
Figure 5:
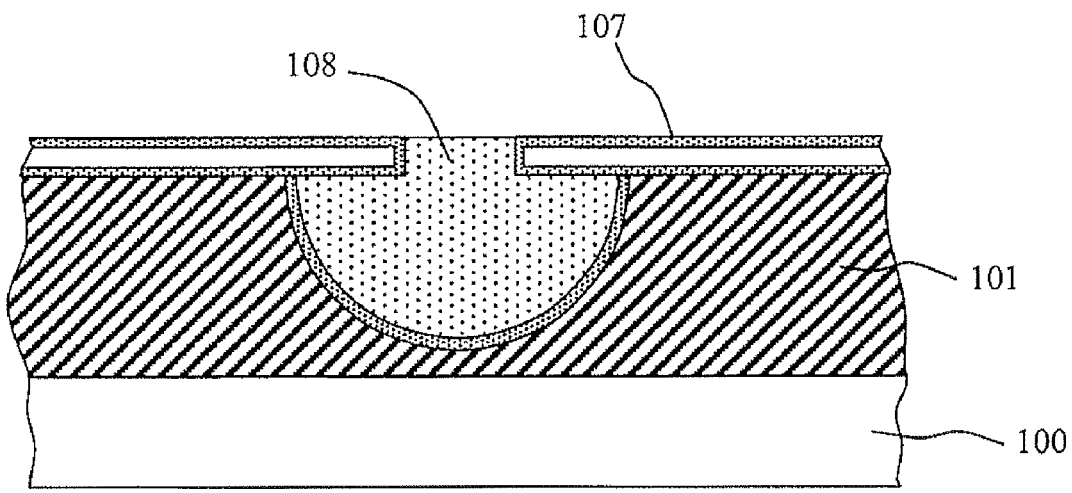
Figure 6:
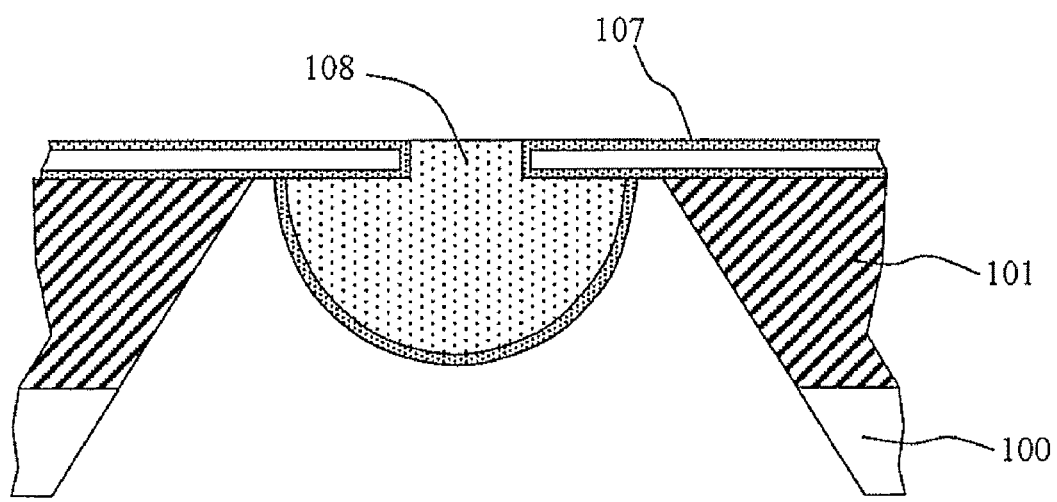
Figure 7:
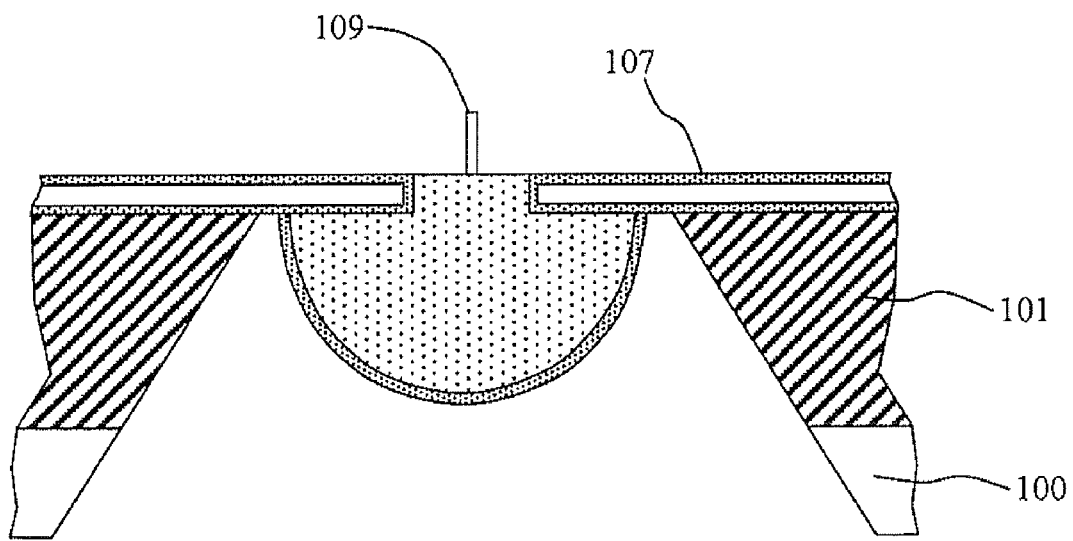

The first material may be silicon, the second material may be silicon or silicon oxide and the third material may, depending on the sublayers, be silicon nitride, silicon oxide and a metal such as, for example, gold or platinum;

in a second step illustrated in FIG. 4, a substantially hemispherical cavity 106 is isotropically etched in the substrate through the aperture in the second layer. The focal area is thus self-aligned with the aperture 103;

in a third step illustrated in FIG. 5, a first conformal coating 107 of a fourth material, which may be silicon nitride, is deposited and then a thick layer 108 of a high-optical-index material, such as silicon oxide or hafnium oxide, is deposited in the hemispherical cavity so as to form the spherical sector of the immersion lens. A second "planarization" operation is then carried out on this first conformal coating;

in a fourth step illustrated in FIG. 6, that part of the substrate covering the spherical sector 108 is eliminated, by anisotropic etching on the rear face of the substrate, so as to expose the spherical sector; and in a fifth step illustrated in FIG. 7, an object 109 of nanoscale dimensions is produced at the center of the aperture in the second layer. This step may be followed by a phase during which a nano-object of highly anisotropic shape is grown, such as a nanowire or a carbon nanotube, in the aperture in the focal area.

Information about this step of producing the nanoscale object may be found in the following publications: "*Carbon nanotubes: opportunities and challenges*" by H. Dai published in Surface Science 500 (2002); "*Epitaxial growth of III-V nanowires on group IV substrates*" by E. P. A. M. Bakkers et al., published in MRS Bulletin, Vol. 32, February 2007; "*Vertically aligned carbon nanofilters and related structures: controlled synthesis and directed assembly*" by Melechko et al., published in Applied Physics Reviews 97 (2005); and "*Propriétés des nanoparticules* [Properties of nanoparticles]" by T. H. Taminiau et al., published in Nano Letters 7, 28 (2007).

To give an example, the step of producing the nano-object may be carried out by what is called a "top-down" approach in which the nano-object is derived from a process in which layers associated with the photolithographic etching process are transferred. The nano-object is then produced in the attached layer by a sequence of typical standard techniques used in microelectronic technologies.

This step consists in transferring a layer constituting the material onto the coating 107 by direct bonding (also called "molecular adhesion"). This layer is shaped in sucession so as to give rise to the nano-object placed at the focal point of the SIL. The process of transferring a layer by direct bonding onto a planar surface made up of several materials is described in the patent US2008/0079123. This method makes it possible:

to combine all types of materials constituting the future nano-object placed at the focal point, even those that cannot be directly produced in the form of a nano-object by direct deposition and/or growth, such as nanowires, nanotubes, nanorods or nanodots;

to control the shape of the nano-object through a dimensional control provided by current photolithographic etching techniques and consequently to exploit all the properties associated with the shape of the nano-object.

Figure 9:
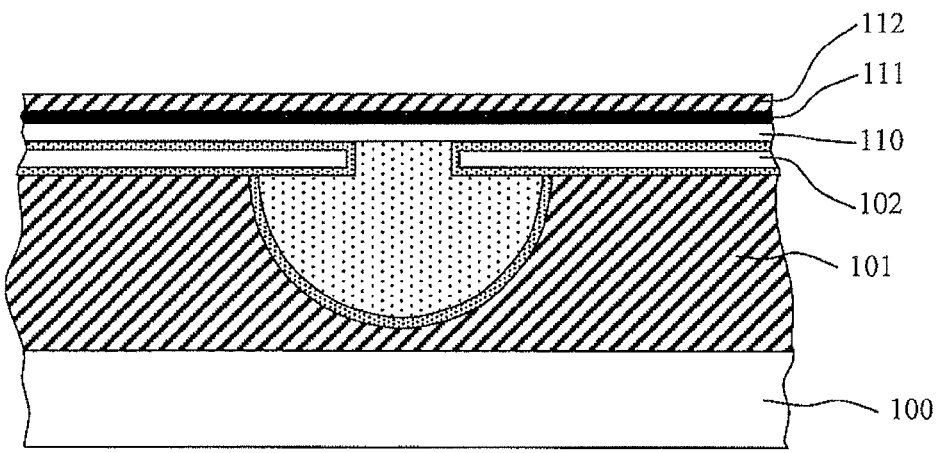
FIGS. 9 to 11 show the various preparatory steps in producing the nano-object.
Figure 10:
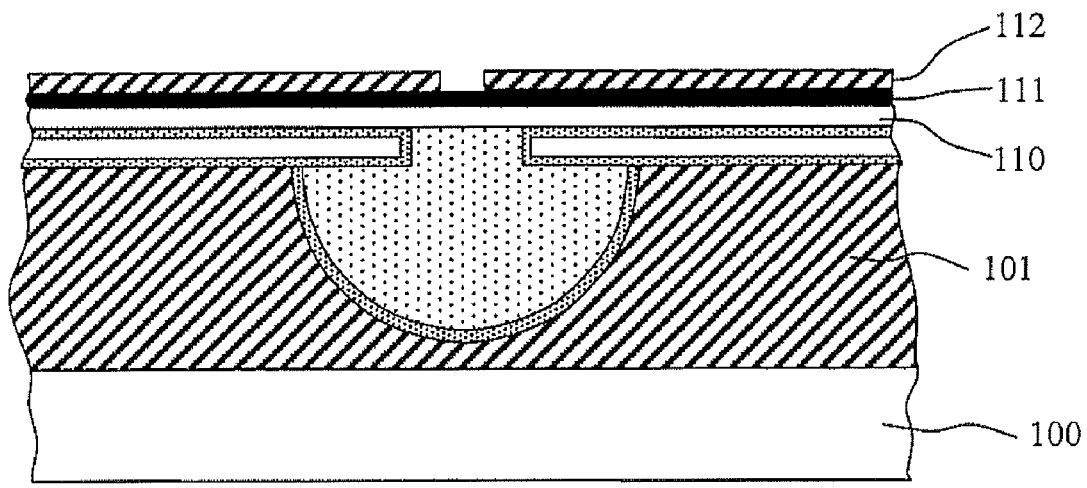
Figure 11:
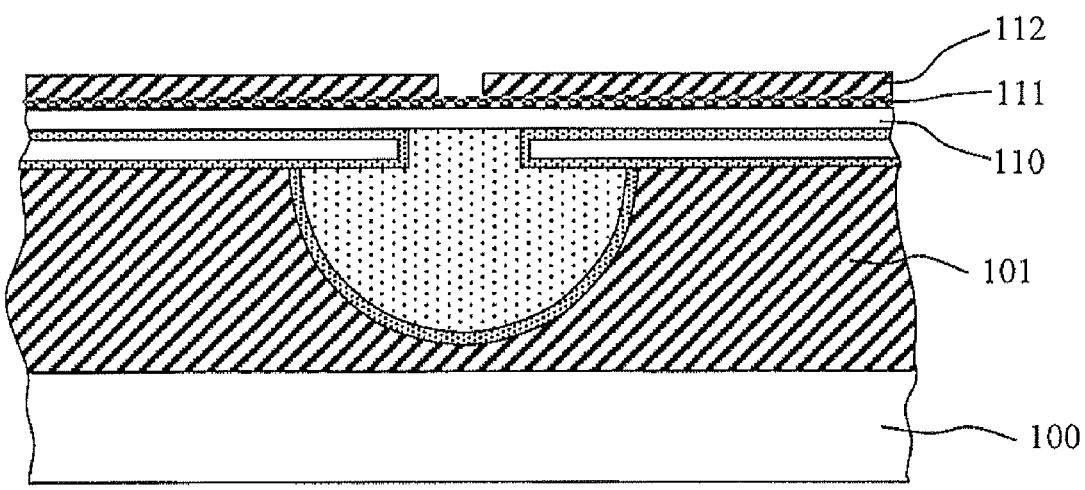

A variant of the process described above, referred to as a "hybrid top-down" process, is to use the attached layer as what is called the "template" layer for growing the nano-object. This variant is described in FIGS. 9, 10 and 11 and is useful for nanowires in which it is necessary to have a crystalline matrix for guiding the growth of the wire along the desired direction. In this case, the orientation of the "template" layer is the same as the preferential nanowire growth direction. For example, for a silicon structure, the crystalline direction is along a <111> direction. As indicated in FIG. 9, the attached layer may be composed of a sandwich comprising the template layer 110, which may be made of silicon, a catalyst layer 111, which may be made of gold, and a protective layer 112, which may be the oxide of the lower layer. Once the protective layer has been locally etched as indicated in FIG. 10, the nanowire may be grown using known procedures. This growth step may precede a heat treatment step carried out on the catalyst layer, as indicated in FIG. 11.

The advantage of this variant is the control in the diameter and the size of the nanowire that can be obtainable. By using CVD (chemical vapor deposition) techniques, wires with a diameter ranging from a few tens of nanometers up to sizes possibly reaching or exceeding 1 micron are obtained.

Figure 8A:
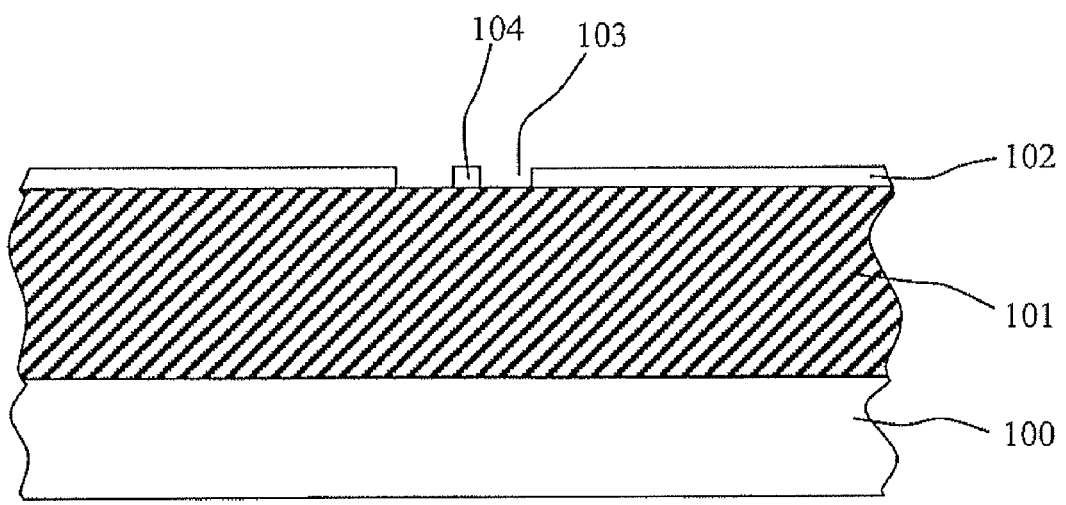
FIGS. 8a and 8b show the first step of a second process for producing a lens according to the invention.
Figure 8B:
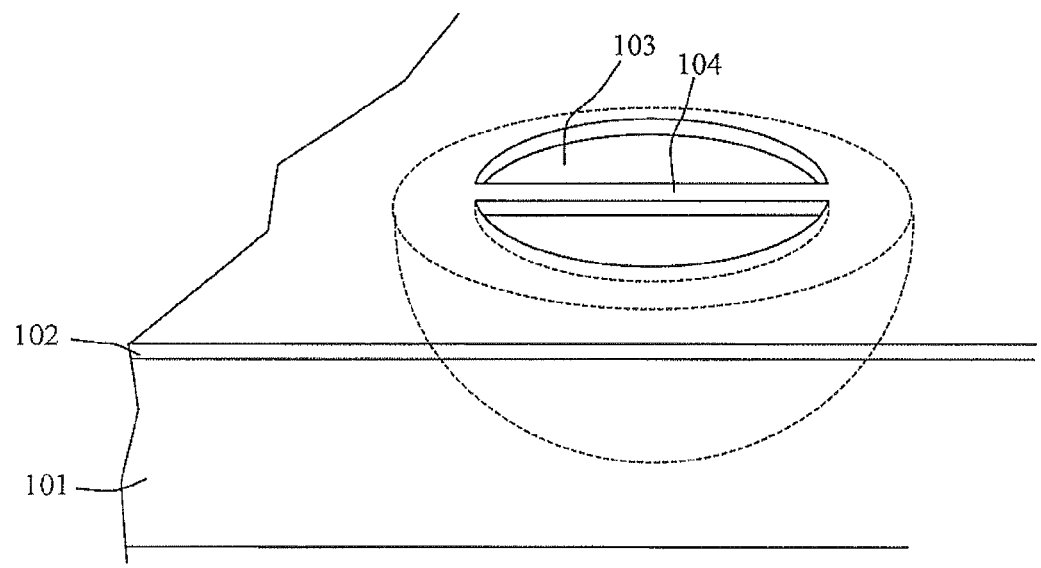

To give a second example, the steps of a second process for producing a lens according to the invention are detailed below. This process is a variant of the previous process and also comprises five production steps:

during the first step of the previous process, a nanopillar 104, centered on the aperture in the second layer is additionally produced in the third material, these features being illustrated in FIGS. 8a and 8b. FIG. 8a is a cross-sectional view and FIG. 8b is a perspective view. The aperture has a diameter smaller in size than that of the focusing structure to be produced. Finally, a sacrificial layer is deposited on the second layer and the sacrificial layer is "planarized";

steps 2, 3 and 4 are substantially the same as the corresponding steps of the previous process;

in a fifth step, a nano-object is produced in the aperture in the focal area starting from a growth phase using the nanopillar produced during the first step as support.

This variant may be carried out using an SOI-type substrate in which the oxide layer is sufficiently thick for fabricating the SIL therein. This thickness may be around 2 or 3 microns. The fabrication of the SIL is then preceded by the production of a nanoscale beam in the crystalline layer of the SOI, which is typically silicon, passing through the aperture through which the isotropic etching takes place.

The fabrication continues using the procedures described above up to the "planarization" steps. The catalyst is then deposited at the focal point of the SIL using one of the processes described. Thus, the catalyst may be already deposited on the semiconductor layer before the beam is etched. A selective grafting operation may also be carried out. Finally, the nanowire or the nanotube is grown.

The process described above is very suitable for obtaining a nano-object made of a mineral material having a given crystalline structure in the form of a nanowire or else in the form of a nanobead.

If the nano-object that it is desired to couple to the SIL is a nanotube, the fabrication process may be simplified because the nanotube growth direction is controlled by the growth conditions and no longer by the orientation of the subjacent layer. It is therefore sufficient to localize the appropriate catalyst using one of the techniques already described.

What is claimed is:

1. A solid immersion lens for optical applications, which comprises a spherical sector bounded by a plane surface, wherein a wire or tube of cylindrical shape made of a semiconductor material, the generatrices of which are perpendicular to the plane surface and at least one dimension of which is of nanoscale, is placed on the plane surface at the focal point of said solid immersion lens.

2. The solid immersion lens as claimed in claim 1, wherein a layer opaque to light having a central aperture of nanoscale dimensions is placed on the plane surface, said aperture being centered on the focal point of the solid immersion lens.

3. The solid immersion lens as claimed in claim 1, wherein the wire is made of silicon.

4. The solid immersion lens as claimed in claim 3, wherein the wire has at its free end a gold nanoparticle.

5. The solid immersion lens as claimed in claim 1, wherein the wire is made of zinc oxide or gallium nitride.

6. The solid immersion lens as claimed in claim 1, wherein the tube is a tubular fullerene.

7. The solid immersion lens as claimed in claim 1, wherein the spherical sector is made of a material having a refractive index greater than 1.

8. The solid immersion lens as claimed in claim 7, wherein the spherical sector is made of silicon oxide.

9. The solid immersion lens as claimed in claim 7, wherein the spherical sector is made of hafnium oxide.

10. An optical device comprising an optical lens as claimed in claims 1, wherein the device includes means for generating an electromagnetic wave that are designed so as to excite the object of nanoscale dimensions.

11. The optical device comprising an optical lens as claimed in claims 1, wherein the device includes means for detecting a localized electromagnetic wave at the object of nanoscale dimensions.

12. The optical device comprising an optical lens as claimed in claims 1, wherein lenses are organized in a matrix comprising several rows of columns, each column comprising several lenses.

13. A process for producing a solid immersion lens as claimed in claims 1, wherein the lens is produced by techniques used for microfabricating microelectronic components.

14. The process for producing a solid immersion lens as claimed in claim 13, wherein the process includes at least a first step of producing:

on a substrate of a first material, a first layer of a second material different from the first material capable of being isotropically etched; and a second layer of a third material having an aperture of nanoscale dimensions.

15. The process for producing a solid immersion lens as claimed in claim 14, wherein the process comprises at least the following steps:

step 2: production, in the substrate or the first layer, through the aperture in the second layer, of a cavity of substantially hemispherical shape by isotropic etching or oxidation;

step 3: deposition of a fourth material in the hemispherical cavity so as to form a spherical sector;

step 4: removal, from the second face of the substrate, of that part of the substrate covering the spherical sector so as to expose the latter; and step 5: production of an object of nanoscale dimensions in the first layer, at the center of the aperture in the second layer.

16. The production process as claimed in claim 15, wherein step 1 is followed by step 1a of producing a nanopillar centered on the aperture in the second layer and in that step 5 consists in producing the object of nanoscale dimensions on the nanopillar.

17. The production process as claimed in claim 15, wherein step 5 is followed by a step 5a of growing a layer of a fifth material on the object of nanoscale dimensions.

18. The production process as claimed in claim 15, wherein the third material is a material opaque to light.

19. The production process as claimed in claim 15, wherein step 5 is followed by a step 6 of producing a layer opaque to light, sparing the object of nanoscale dimensions.

20. The production process as claimed in claim 15, wherein step 5 includes a substep of transferring at least a layer constituting the material onto the deposited layer by direct bonding.

21. The production process as claimed in claims 15, wherein the first material is silicon, the second material is silicon or silicon oxide, the third material is silicon oxide or silicon nitride, and the fourth material is a material having a high refractive index, such as silicon oxide or hafnium oxide.

22. The process for producing a solid immersion lens as claimed in claim 13, wherein the process includes at least a first step of producing, on a substrate of a first material capable of being isotropically etched, a second layer of a third material having an aperture of nanoscale dimensions.

23. The process for producing a solid immersion lens as claimed in claim 22 wherein the process comprises at least the following steps:
- step 2: production, in the substrate or the first layer, through the aperture in the second layer, of a cavity of substantially hemispherical shape by isotropic etching or oxidation;
- step 3: deposition of a fourth material in the hemispherical cavity so as to form a spherical sector;
- step 4: removal, from the second face of the substrate, of that part of the substrate covering the spherical sector so as to expose the latter; and
- step 5: production of an object of nanoscale dimensions in the first layer, at the center of the aperture in the second layer.

24. The production process as claimed in claim 23, wherein the first material is silicon, the second material is silicon or silicon oxide, the third material is silicon oxide or silicon nitride, and the fourth material is a material having a high refractive index, such as silicon oxide or hafnium oxide.

* * * * *

UNITED STATES PATENT AND TRADEMARK OFFICE
CERTIFICATE OF CORRECTION

| | | |
|---|---|---|
| PATENT NO. | : 7,940,477 B2 | Page 1 of 1 |
| APPLICATION NO. | : 12/678730 | |
| DATED | : May 10, 2011 | |
| INVENTOR(S) | : Mickaël Brun et al. | |

It is certified that error appears in the above-identified patent and that said Letters Patent is hereby corrected as shown below:

In the Claims:
Column 10, Claim 10, line 30, change "claims 1" to read --claim 1--.
Column 10, Claim 11, line 34, change "claims 1" to read --claim 1--.
Column 10, Claim 12, line 38, change "claims 1" to read --claim 1--.
Column 10, Claim 13, line 42, change "claims 1" to read --claim 1--.

Signed and Sealed this
First Day of November, 2011

David J. Kappos
*Director of the United States Patent and Trademark Office*